Aug. 9, 1932.　　　　C. R. BIRDSEY　　　　1,870,439
PLASTER BOARD AND METHOD OF MAKING SAME
Filed Aug. 31, 1928　　2 Sheets-Sheet 1

INVENTOR
Charles R. Birdsey.
BY
ATTORNEY

Aug. 9, 1932.   C. R. BIRDSEY   1,870,439
PLASTER BOARD AND METHOD OF MAKING SAME
Filed Aug. 31, 1928   2 Sheets-Sheet 2
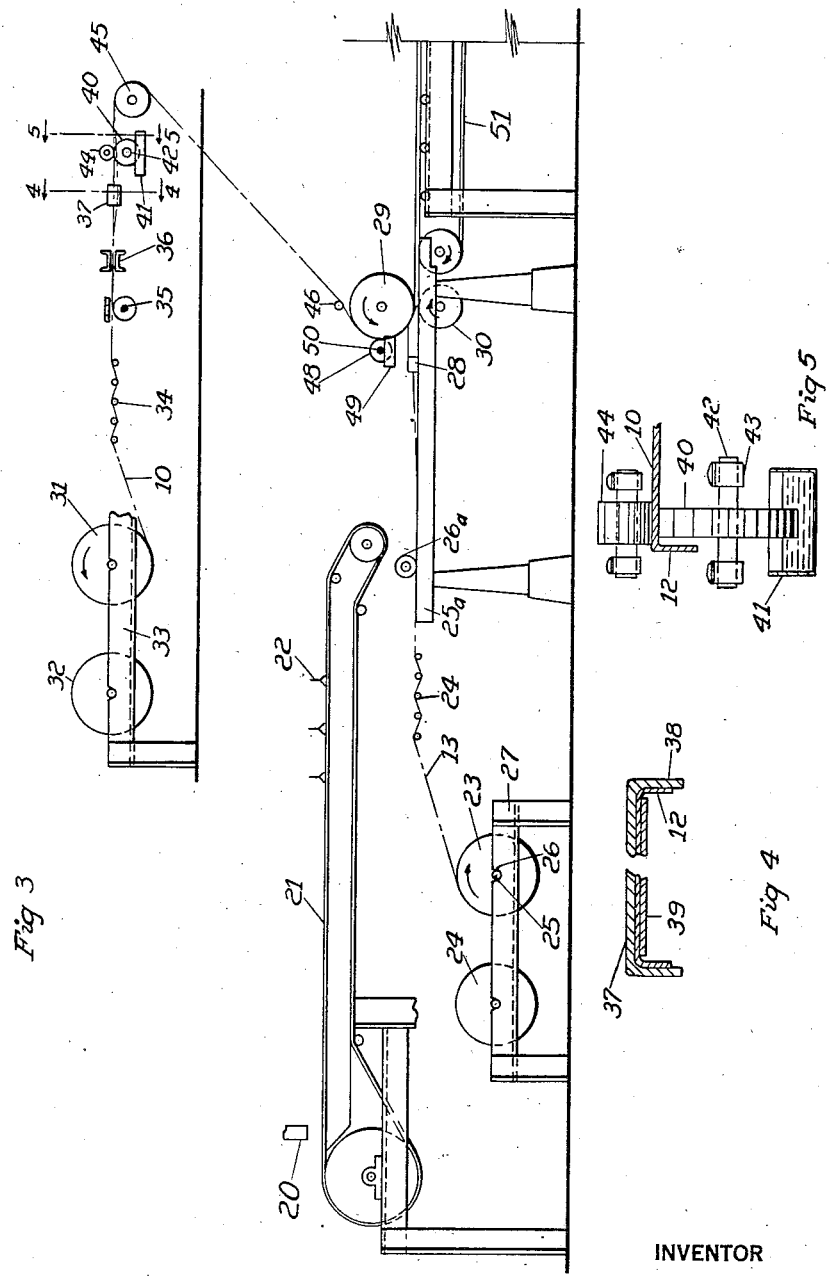
INVENTOR
Charles R. Birdsey
BY
ATTORNEY Patented Aug. 9, 1932

1,870,439

UNITED STATES PATENT OFFICE

CHARLES R. BIRDSEY, OF HINSDALE, ILLINOIS, ASSIGNOR TO UNITED STATES GYPSUM COMPANY, OF CHICAGO, ILLINOIS, A CORPORATION OF ILLINOIS

PLASTER-BOARD AND METHOD OF MAKING SAME

Application filed August 31, 1928. Serial No. 303,243.

Figure 1:
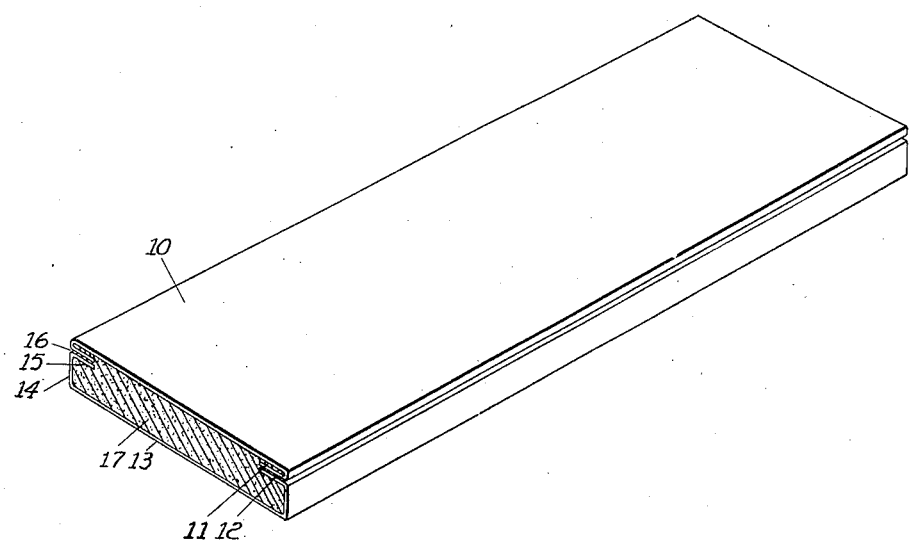

My invention relates to plasterboard having folded edges such as that shown in my Patent 1,358,508, November 9, 1920, especially as shown in Fig. 1, of that patent.

The invention further relates to a method of producing said plasterboard.

Considerable difficulty has been experienced in manufacturing this plaster board, or wallboard, because of the fact that the folded cover sheet could not be passed around the head roll without causing the buckling and distortion of the fold 8, on said cover sheet. In order to even approximate this construction, it was necessary to cause the cover sheet to approach the head roll at a very slight angle to the horizontal, so as to avoid, as much as possible, the buckling at this fold 8. However, in this case a new difficulty was experienced, since the cover sheet now obstructed the vision of the operator of the machine so that he could not easily see the gypsum core material lying on the bottom sheet and detect faulty operation of the machine. Also in this type of plasterboard, the seam down the center of each edge prevented the application of printed matter or indicia to said edge.

An object of this invention, therefore, is to provide a plaster board in which the fold under the cover sheet, is lying in abutting relation under said cover sheet, with no attempt to fill the space between said fold and the cover sheet with the gypsum core material.

Another object of the invention is to simplify the manufacture of plaster board by providing clear vision for the operator of the plaster board machine, especially at the point where the plaster board enters under the head roll.

A further object of the invention is to provide a method of forming plaster board of the above described nature, in which the angle between the approaching cover sheet and the bottom sheet before entry under the head roll, is obtuse instead of acute, as was customary under the old practice.

A further object of the invention is to provide a plaster board having several plies of paper adjacent each edge, which serve to reinforce said edges during shipment and also provide reinforced edges suitable for the reception of nails when the plaster board is attached to studding.

A still further object of the invention is to provide a plaster board having the seams of the cover sheets appearing at the corners of the board so that the faces and edges are flat and suitable for receiving indicia and decorations.

Figure 2:
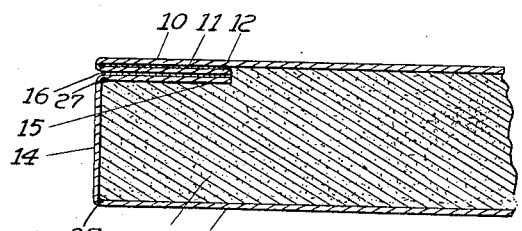

Reference is to be had to the accompanying drawings forming a part of this specification, in which Fig. 1 is a perspective, sectional view showing my improved plaster board, Fig. 2 is a fragmentary, sectional view through one edge of the plaster board, on a large scale, Fig. 3 is a diagrammatic elevation of one end of my improved plaster board machines, Fig. 4 is a sectional elevation on line 4—4 of Fig. 3 showing the device for turning the edges of the cover sheets, and Fig. 5 is a sectional elevation on line 5—5 of Fig. 3 showing the method of applying paste under the fold of the cover sheet.

The cover sheet 10 of the plaster board is turned inwardly along the edge to form a flap 12, said flap being firmly attached to cover sheet 10, by means of adhesive 11. The bottom sheet 13, of the plaster board is bent at right angles along the edge, to form a side edge 14, and this side edge is then turned directly back parallel to the bottom sheet 13 to form the fold 15. An adhesive 16 is provided between the folds 12 and 15, so as to firmly attach said folds together. An adhesive consisting of partially dextrinized starch may be used with satisfaction. This is an adhesive commonly known to the plasterboard art as "KB paste". A core 17 of gypsum composition or other suitable cementitious material, is disposed between the cover sheet 10 and bottom sheet 13, so as to form a definite adhering bond for each of said cover sheets. Instead of the adhesive 16, some of this core material 17 may be squeezed out between the folds 12 and 15 so as to bind said folds firmly together.

It is thus seen that the resulting plaster board, has a four ply nailing edge along opposite sides thereof, and that such a board is reversible in that both top and bottom sheets present a flat surface without joints. The edge of the board also presents a flat surface suitable for the application of printing, trade-mark, directions, or any other information or indicia. Due to the fact that the folds along the edges of the board are sealed together tightly by adhesive, said edge of the plaster board is much stronger and is less liable to be damaged during shipment or when being handled incident to the application of said plaster board to the studding.

The manufacture of my improved plaster board is accomplished by the apparatus shown in Figures 3, 4 and 5, in which the gypsum composition forming the core 17 of the board, is introduced through a chute 20, onto a conveyor belt 21, which is preferably formed in the machine in a manner well known in the art, as a channel for properly supporting the plastic material during subsequent mixing. Mixing fingers 22, of the usual construction, are positioned above the mixing belt 21 so as to thoroughly incorporate the ingredients of such composition into a homogeneous mass. The paper for forming the bottom sheet of the plaster board is ordinarily supplied from a roll 23, a reverse roll 24 of said paper being provided also, said rolls being supported on suitable shafts 25 which are rotatably mounted in slots 26 formed in supporting framework 27. The bottom sheet 13 passes upwardly at a slight angle from the roll 23 and over a plurality of tension rollers 24. From the rollers 24, the bottom sheet passes on to a table 25ₐ which is provided with a scoring wheel 26ₐ adapted to form score marks 27 in said bottom sheet to permit the subsequent folding of the edge as shown in Fig. 2. This folding is accomplished by means of a folding device 28 of standard design which is located immediately in front of a head roll 29, a suitable idler roll 30 being also provided underneath the bottom sheet 13 and spaced apart from said roll 29 approximately the thickness of the finished plaster board.

The paper of the cover sheet 10 is supplied from a roll 31, a reserve roll 32 of said paper being also provided. The rolls 31 and 32 are supported similar to rolls 23 and 24 on framework 33. The paper cover passes from roll 39 through tension rollers 34 and over a scoring wheel 35 which forms a single score mark along the edge of the paper cover to permit the subsequent turning of the fold 12. The paper cover then passes between suitable guides 36 and then through a folding device 37 composed of a channel shaped member with its sides 38 gradually sloping inwardly, a supporting table 39 being provided underneath the folding member 37 as seen in Fig. 4. When the paper cover has passed a point where the fold 12 extends downwardly in a substantially vertical position, a wheel 40 is arranged so as to contact with the cover sheet 10 adjacent the fold 12, the bottom of said wheel 40 dipping into a pan 41 of adhesive. Wheel 40 is secured to shaft 42, the latter being rotatably mounted in bearings 43. Frictional contact of the wheel 40 with the paper cover serves to cause the rotation of the adhesive wheel. Another idler wheel 44 is rotatably mounted above the adhesive wheel 40 so that the cover sheet 10 is firmly held between said wheels 40 and 44.

As the cover sheet passes beyond the adhesive wheel 40, the fold 12 continues to turn inwardly and eventually lies in abutting relation to the cover sheet 10 when said cover sheet reaches an idler roll 45. The cover sheet then passes under a tension roll 46 and over the head roll 29, the angle between the bottom sheet 13 and cover sheet 10 adjacent said head roll 29, being obtuse instead of acute as was customary under the old practice so that the operator of the machine has clear vision of the plaster board as it enters under the head roll 29. A second pair of adhesive wheels 48 is mounted to rotate in an adhesive pan 49, said wheels being mounted on a shaft 50 so as to contact with the lower face of fold 12 and deposit a layer of adhesive 16 thereon. As the finished board passes out from under the head roll 29, it is received by a conveyor belt 51, is carried forwardly for a suitable distance to permit the setting of the gypsum core and is then conveyed a further distance through a drying kiln to produce a finished, dry plaster board.

Briefly, the method of manufacture consists in depositing the plastic composition through spout 20 onto the conveyor belt 21 and then mixing said material with mixing fingers 22. The plastic material is then deposited from belt 21 onto a moving sheet of paper 13 which is being continually unwound from roll 23, passing through friction rollers 24 and then over table 25ₐ. The scoring wheels 26ₐ score the edges of the sheet 13, and the folding device 28 folds the edge flaps to form folds 14 and 15. The top sheet 10 is unwound from roll 31 and passed through friction rolls 34 past the scoring wheels 35 which scores the edges of the sheet preparatory to turning the folds 12. The sheet now passes through guides 36 and the folding device 37 which turns the fold 12 downwardly. The sheet 10 adjacent the edges then receives a coating of adhesive by means of the adhesive wheels 40. The folding is then completed and the sheet passes around roll 45 and then to head roll 29 where adhesive 16 is applied by means of adhesive wheel 48. The head roll 29 now applies the cover sheet 10 to the top of the plastic core 17 of the board and the finished board is carried ahead by conveyor 51 through a length of travel sufficient to produce setting of the core and then through a drying kiln for producing the dry finished board.

I would state in conclusion that while the examples of the product, machine and method of manufacture, illustrated and described, represents a practical embodiment of my invention, I do not limit myself precisely to these details, since, manifestly the same can be considerably varied without departing from the spirit of the invention as defined in the appended claims.

Having thus described my invention, I claim as new and desire to secure by Letters Patent:

1. A plaster board comprising a body portion of cementitious material, a covering sheet secured on each face thereof, one of said cover sheets being folded around the edge of said board and having a second fold extending across a portion of the opposite face of said body parallel to said sheet, and a selvage edge formed by folding the edge of the second cover sheet, said selvage edge being secured to said second mentioned fold by an adhesive different in composition than said cementitious material.

2. A plaster board comprising a body portion of cementitious material, a paper covering sheet secured to one face of said body portion and having its edges folded about the edges of said body portion so as to form inwardly directed folds adjacent the opposite face of said body portion, a second cover sheet secured to the second face of said body portion, a second fold formed along opposite edges of said second cover sheet, said second fold being secured by adhesive to said cover sheet so as to form a selvage edge, and adhesive different in composition than said cementitious material adapted to connect the inwardly directed folds with said selvage edges of said second cover sheet.

3. A plaster board comprising a cementitious body portion having a cover sheet attached to each face thereof, inwardly directed folds formed on each of said cover sheets, adhesive means different in composition than said cementitious material for attaching the folds of the two cover sheets together, and a section of said cementitious body portion separating the folds of one cover sheet from said cover sheet.

4. A plaster board comprising a pair of cover sheets secured together by a cementitious body portion, and folds formed on the edges of one of said cover sheets, said folds being attached to the second cover sheet by an adhesive different in composition than said cementitious body portion, both faces of said plaster board presenting a flat surface without joints suitable for decoration and other purposes.

5. The method of forming plaster board, which comprises advancing a cover sheet, depositing a plastic, cementitious material thereon, turning the edges of said cover sheet about such plastic material, advancing a second cover sheet, turning the edges of said second cover sheet so as to form folds, adhesively securing said folds to said second cover sheet, and passing said second cover sheet onto said plastic material at an obtuse angle to said first cover sheet to form a plaster board.

6. The method of forming plaster board, which comprises advancing a cover sheet, depositing a plastic, cementitious material thereon, turning the edges of said cover sheet about said plastic material, advancing a second cover sheet, folding the edges of said second cover sheet to form folds integral therewith, and passing said second cover sheet about a head roll at an obtuse angle to said first mentioned cover sheet so as to form a finished plaster board.

7. The method of forming plaster board, which comprises advancing of cover sheet, depositing a plastic, cementitious material on said cover sheet, turning the edges of said cover sheet about said plastic material, advancing a second cover sheet, applying an adhesive to said second cover sheet, turning the edges of said second cover sheet so as to form folds adhesively attached to said second cover sheet, applying a second adhesive to the folds of said second cover sheet, and passing said second cover sheet onto said plastic material at an obtuse angle to said first cover sheet so that the folds of the second and first cover sheets are adhesively attached together.

8. A method of forming plaster board, which comprises advancing of cover sheet, turning the edges of said cover sheet to form folds about said plastic material, advancing a second cover sheet, turning the edges of said second cover sheet to form folds integral therewith, passing said second cover sheet about a head roll at an obtuse angle to said first mentioned cover sheet, and applying said second cover sheet to said cementitious material so as to form a finished plaster board.

CHARLES R. BIRDSEY.